United States Patent [19]

Debell, Jr. et al.

[11] 4,388,762
[45] Jun. 21, 1983

[54] CHAIN SAW MEASURING DEVICE

[76] Inventors: John H. Debell, Jr.; David J. Allen, both of Bennington, Vt.

[21] Appl. No.: 290,024

[22] Filed: Aug. 5, 1981

[51] Int. Cl.³ .............................................. B27G 23/00
[52] U.S. Cl. .................................................. 33/185 R
[58] Field of Search ................. 33/185 R, 180 R, 202, 33/403, 161; 30/373

[56] References Cited

U.S. PATENT DOCUMENTS

| | | | |
|---|---|---|---|
| 2,765,007 | 10/1956 | Hoffmann | 33/185 R |
| 2,800,933 | 7/1957 | Michael | 30/373 |
| 3,276,490 | 10/1966 | Johansson | 33/185 R |
| 3,364,580 | 1/1968 | Lucia | 33/185 R |
| 3,531,870 | 10/1970 | Romancky | 33/185 R |
| 4,173,240 | 11/1979 | Boyce | 30/373 |
| 4,299,034 | 11/1981 | DeBetta | 33/185 R |

Primary Examiner—Willis Little
Attorney, Agent, or Firm—Henderson & Sturm

[57] ABSTRACT

This invention relates in general to a measuring device for portable chain saws, and more particularly to a measuring device which is attachable to any portable power saw, for measuring the logs or other materials being cut, so that the cut section will be of a predetermined uniformed length. This invention is characterized by the fact that the measuring element originates immediately below the cutting chain, and can be pivoted to the left or right of the blade, or retracted into storage in the same plane as the blade or chain.

13 Claims, 5 Drawing Figures

CHAIN SAW MEASURING DEVICE

BACKGROUND OF THE INVENTION

It is frequently desirable to cut logs to a uniform predetermined length, either for the most efficient use in wood burning stoves, or for sale as pulp wood, or for other reasons. Marking logs to be cut often takes as much time as cutting them. It is clearly advantageous, therefor, to utilize a means of measuring a log that eliminates the need for marking beforehand. The present invention offers significant improvements in structure, function and design, thereby making such a measuring device far more practicable, and eliminates the need for a workman to carry additional tools such as a ruler, hatchet, handsaw, etc.

Over the years there has been a significant amount of inventive activity directed toward measuring devices combined with portable chain saws. Examples include, Hoffmann, U.S. Pat. No. 2,765,007, which provides a measuring device of predetermined length, having a mounting bracket which has to be seperately manufactured for the various external configurations of the numerous chain saws on the market today. Similarly Johansson, U.S. Pat. No. 3,276,490, involves a removable measuring device, which not only requires disassembly of the saw, but also requires the worker to manually secure the hook in one end of the log, and then walk the required distance while carrying the running chain saw. This method is not only time consuming, but potentially very dangerous as well.

Lucia, U.S. Pat. No. 3,364,580, teaches the use of a motorized attachment for chain saws, which allows a tape measure to be extended and retracted, by using the same power source as the saw itself. This method is not only extremely expensive to manufacture, but also requires major modification to the gasoline chain saw on which it is employed, and may not work at all on the newer electrical models. In addition, Romancky, U.S. Pat. No. 3,531,870, utilizes a telescopic measuring device that is permanently affixed, and will only measure to one side of the operator using the saw.

While the aforementioned patents deal with measuring devices for chain saws, they are uniformly deficient in their failure to provide a chain saw measuring device that is not only inexpensive to manufacture, and requires no modification to the existing saw, but also is adjustable to measure from either the right or left side of the operator, as well as being positioned in such a manner as to facilitate carrying the saw through rough underbrush.

SUMMARY OF THE INVENTION

A principal object of the present invention is to provide a self contained measuring device for portable chain saws, which may be removably attached to any chain saw without requiring any modification to the saws design or structure.

A further object of the present invention is to provide a measuring device for a portable chain saw that can be rotated so that measurements can be made from either side of the saw, thereby making the sawing operation safer and more comfortable for the operator, by allowing him to stand on whatever side of the log, or other material, that he wishes.

Another object of the instant invention is to provide a mounting bracket, which hangs below the saw, and not only allows the measuring device to rotate, but also permits adjustment of the measuring rod, so that different lengths may be determined at the discretion of the user.

A yet further object of the present invention is to provide a measuring rod which is slidably mounted in the rotatable portion of the bracket so that different measure lengths may be obtained.

Still another object of the present invention is to provide a flexible measuring rod, so as to prevent breakage, and to allow for variations in the material being cut, such as knots, limbs, stubs, etc.

A still further object of the present invention is to provide a measuring rod with a "T" shaped attachment at its distal end, to engage the end of the work piece, thereby locating the saw blade to cut off a piece equal to the predetermined length.

These and other objects, advantages and novel features of the invention will be fully understood when considered in light of the following detailed description of the invention when viewed in conjunction with the accompanying drawings.

DETAILED DESCRIPTION OF THE PREFERRED EMBODIMENT

Figure 1:
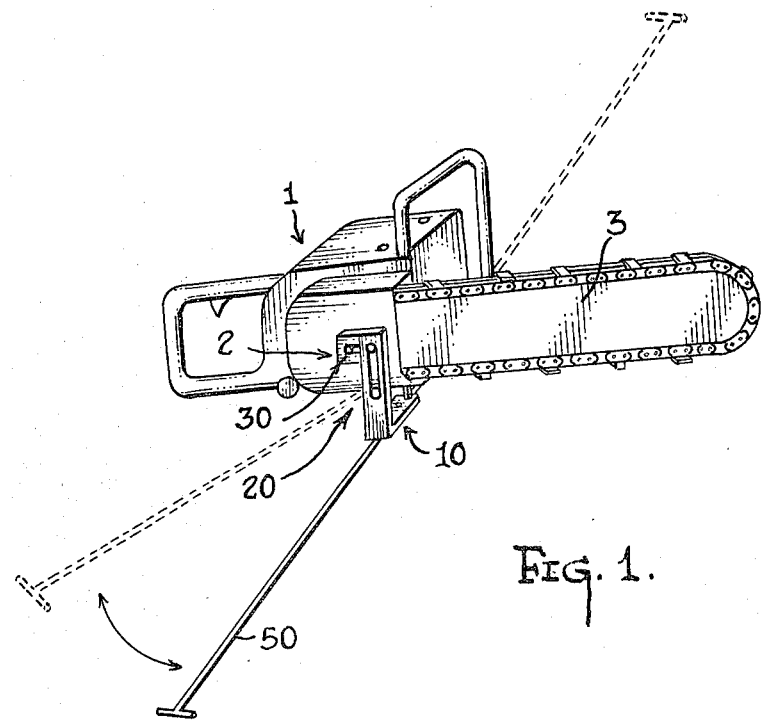
FIG. 1, is a perspective view of the measuring device, as it would appear mounted on a typical chain saw, and illustrates some of the various positions that the measuring member can assume.

As can be seen by reference to FIG. 1, the chain saw measuring device, which forms the instant invention is designated generally as 10; and is shown mounted on a typical chain saw 1, which is comprised of a motor housing 2, and a chain saw blade element 3.

As with most, if not all chain saw constructions, the chain saw shown in FIG. 1, is provided with means to secure the chain bar to the housing, which normally comprise a pair of threaded chain bar mounting studs 5 and complimentary nuts. The studs 5 extend through the housing 2 and are secured thereto, in a well known manner, by tightening of the complimentary nuts. The present invention takes advantage of that standard construction, and incorporates it into a mounting arrangement, which is adaptable to at least the majority of the chain saw constructions found on the market today.

Figure 2:
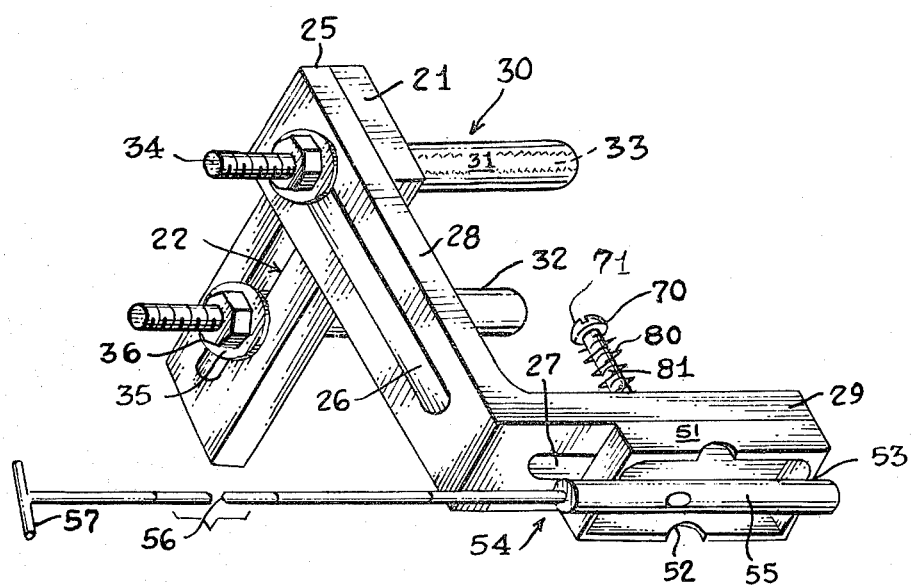
FIG. 2, is an isometric view of the measuring device alone, on an enlarged scale.

Referring now to FIG. 2, it can be seen that the measuring device 10 comprises a mounting bracket 20, having securing means 30, and a pivotal measuring member 50. The mounting bracket 20 is made up of two seperate members, and comprises a flat rectangular member 21 having an elongated aperture 22 running along its length, and an L-shaped member 25 having elongated apertures 26 and 27 disposed on its vertical 28 and horizontal 29 legs.

The securing means 30 comprises a pair of elongated adaptor elements 31, which are substituted for the complimentary nuts, which cooperated with the chain bar mounting studs 5, prior to the measuring device 10 being mounted on the chain saw. The adaptor elements 31 comprise a generally cylindrical member 32 having a threaded aperture 33 (in phantom) on one end, and a reduced diameter threaded stud portion 34 on the other end. The threaded aperture 33 is dimensioned to cooperate with the chain bar mounting studs 5, and the threaded stud portion 34 is dimensioned to cooperate with the washer 35 and nut 36.

Once the adaptor element, or standoff nut 31 has been secured to the chain bar mounting studs, the mounting bracket 20 can be secured to the chain saw housing 2 in the following manner. By virtue of its elongated length the adaptor elements project a substantial distance beyond the chain saw housing in the vicinity of what is commonly referred to as the chain saw dog. The threaded stud portion 34 of the adaptor 31 is of sufficient length, to be received within, and extend beyond, the apertures 22 and 26 in the mounting bracket member 21 and 25 respectively. Once the adaptor elements 30 and the bracket members have been arranged as shown in FIG. 2, the washers 35 and nuts 36 are disposed on the threaded stud portions 34 to secure the bracket members 21, 25 in place on the chain saw housing.

It should be appreciated that the structure thus far described can be adapted to most currently available chain saw constructions. The elongated aperture 22 in bracket member 21 is adapted to accommodate mounting studs having different lateral displacements; and the elongated aperture 26 in the bracket member 25 allows the horizontal leg 29 to move in the vertical plane with respect to bracket member 21.

The measuring apparatus 50 comprises a base member 51 having recesses 52, 53, which are aligned in a planes parallel and perpendicular to the plane of the chain saw blade. These recesses form detents for a rotable and vertically displacable measuring element 54 comprising a housing 55, which contains a retractable flexible measuring member 56 in the form of a rod having a T-shaped fitting or lug 57 disposed on its distal end. The housing 55 is rotatably disposed on one end of an elongated rod member 60, which is dimensioned, to be received within, and project beyond, the aperture 27 in the horizontal leg 29 of bracket member 25, and also to pass through a suitably dimensioned aperture in the base member 51 at the juncture of the recesses 52 and 53. The other end of the elongated rod 60 is provided with a lock nut 70, having an enlarged head 71, which forms a bearing surface for a spring biasing member 80. The spring biasing member 80 is in the form of a helical spring 81 which surrounds the threaded rod 60, and bears on one end on the lock nut 70 and on the other end on the tops surface of the bracket 25.

The biasing force exerted by spring member 80 frictionally engages the measuring element 54 against the base member 51 and the underside of bracket 25, to secure the measuring apparatus 50 in place. This arrangement also allows the measuring apparatus to be laterally displaced along the horizontal leg of bracket 25, and will further permit the housing 55 to be rotated with respect to the base member 51, when the spring biasing force is overcome by manual or mechanical means.

It should be obvious at this point that the spring 80, which is employed with this device, must have sufficient strength to maintain all of the components in the attitude and relative position which is selected by a user of this device, and will not inadvertantly allow lateral displacement of the base member along bracket 25 as a consequence of vibrations imparted to the respective elements by the chain saw.

Along those same lines, it should also be apparent that further structural modifications and substitutions can be made to insure that the components remain in their assembled and predetermined positions. For example this invention contemplates and is considered to encompass a track portion on the lower bracket leg 29 which will slidingly support the base member 51, and releasable locking means to secure the base member to the bracket at predetermined positions. It is furthermore envisioned that a straight pivoting arrangement can be employed without the necessity of detent means, if the rotatable housing is also provided with releasable locking means to maintain the housing in a given position.

The primary criteria for the measuring device 50 are that it can be laterally displaced along the horizontal leg 29 of the bracket 25, and can be pivoted with respect to the bracket and locked into place. Obviously a member of suitable structures can be employed for this purpose, and the structure herein discribed is merely representative of one such construction which can meet these criteria.

The measuring member 56 as shown in FIG. 2, is in the form of an elongated flexible telescoping rod; however, a flexible retractable marked steel tape would also be suitable for this purpose. Again the primary criteria for the measuring member 56 are that it be retractable, extensible, flexible, capable of being locked into position, and adapted to receive a lug on its distal end. The lug is designed to hook over one end of the material to be cut to insure that uniform lengths are produced by using this device. The member 56 must be extensible and retractable so that it can be extended a predetermined distance and locked into place during use, and can be retracted and stored during non-use or transportation through brush or the like. It is also important that the measuring member 56 have a degree of flexibility, so that the member can accommodate or conform to irregularities (i.e. knotholes, stubs, etc.), in the material being cut. This feature is particularly useful when cutting lengths of firewood where precision is not an absolute requirement, yet a close approximation of a predetermined distance is desirable.

Figure 3:
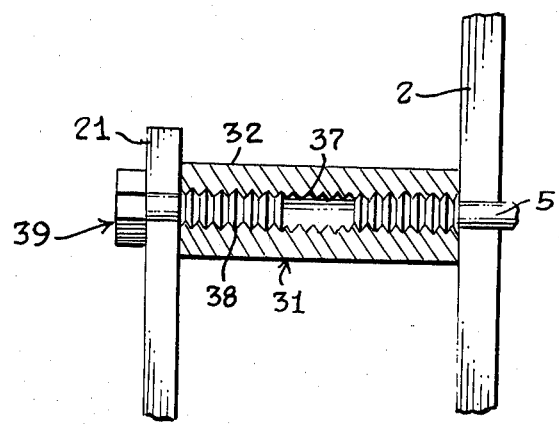
FIG. 3, is a detailed view of an alternate embodiment of the mounting means for the support member.

An alternate structure for the securing means 30 is illustrated in FIG. 3, wherein the adaptor element 31 comprises a generally hollow cylindrical member 32, wherein the interior of the cylinder is provided with threads 37, which cooperate on one end with the chain bar mounting studs 5, and on the other end with a similarly threaded locking stud 38 having an enlarged head 39, which can be substituted for the reduced diameter threaded stud portion 34, and the washer 35 and nut 36 of the preferred embodiment.

The operation of the device 10 is as follows. Once the mounting bracket 20 has been secured to the chain saw housing 2 via the securing means 30, the measuring apparatus 50 is positioned on the lower leg 29 of bracket 25 so that the pivot point or axis of rotation for the measuring element housing 55 coincides with the plane of rotation of the chain saw blade. After the base member 51, and associated housing 55, have been secured at the desired location, the housing can be rotated with respect to the base member to deploy the measuring device in its operative or stored position.

Figures 4A, 4B:
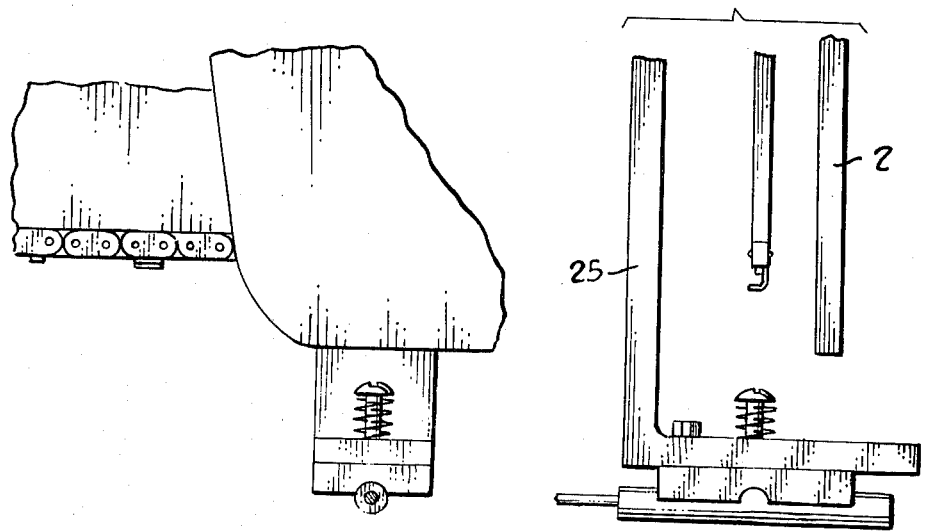
FIGS. 4a and 4b, are partial side and front views respectively of the relationship of the measuring device and the chain saw blade in the operating mode.

FIGS. 4a and 4b, show the measuring device in its operative position which would coincide with the position illustrated in phantom in FIG. 1. Since the pivot point for the measuring device is positioned directly beneath the plane of the chain blade, the device can be pivoted perpendicular to the blade, to the right or to the left, at the discretion of the user. Once the measuring element 56, has been set and locked at the desired length, it will not make any difference, which side the device is rotated to, since the distance from the blade to the end of the lug will always remain the same.

When it is no longer required to use the measuring device, or when the user must travel through brush to reach another tree, the spring bias on the housing may be overcome by manual or mechanical means, and the housing may be rotated into the same plane as the chain blade. In this position, the member 56 may be retracted slightly, so that it will not project beyond the end of the blade, or it can be fully retracted into the storage mode.

From the foregoing description, it should be obvious that we have perfected significant improvements in the design of measuring devices to be attached to chain saws to facilitate the cutting of logs and wood sections of all kinds to a specified predetermined length. The device is of simple, rugged construction, easily attached to a wide variety of chain saws without special tools, techniques or permanent modifications. It protects the operator from a variety of potentially dangerous situations; to be used, the saw must be brought close to the work piece, reducing the risk of the saw pulling away from the operator, or worse, kicking cack; the measuring rod is flexible, allowing the operator to keep the saw dog in contact with the work piece, while the rod flexes around knots, burls and other obstructions on the work piece; it allows the operator to shift the measuring rod from one side to the other, allowing him to select the most secure footing, or the clearest area for sawing, without inducing him into sawing from awkward or insecure positions. Because the device can be rotated into the same line as the chain saw bar, it is very easy to carry through brush or undergrowth on the way to or from the work place, without concern for snagging heavy, rigid measuring devices, or bending or breaking more delicate ones.

It is to be understood that the foregoing description represents a typical configuration of a device that is susceptible of many variations in structure and design all of which are within the spirit of the invention, and that its scope should be limited only by the scope of the appended claims.

What we claim:

1. A measuring device for use with chain saws and adapted to cooperate with one or more threaded chain bar mounting studs on the chain saw housing, comprising;
   at least one elongated adaptor element having a threaded aperture on one end dimensioned to cooperate with a threaded chain bar mounting stud,
   a mounting bracket, comprising an apertured L-shaped bracket member operatively connected to said at least one adapter element, and
   a measuring apparatus rotatably mounted on said L-shaped bracket member, and adapted to be shifted along a portion of said bracket, to position its axis of rotation in the same plane as the blade on the chain saw.

2. A measuring device as in claim 1; wherein, the elongated adaptor element further comprises a reduced diameter threaded stud portion on the other end, which cooperates with a washer and nut to secure the L-shaped bracket member to the adaptor element.

3. A measuring device as in claim 1; wherein, the threaded aperture extends the entire length of the elongated adaptor element, and cooperates with a threaded locking stud having an enlarged head to secure the L-shaped bracket member to the adaptor element.

4. A measuring device as in claim 1; wherein, the L-shaped bracket has an elongated aperture disposed in its vertical and horizontal legs.

5. A measuring device as in claim 4; wherein, the aperture in the vertical leg of the L-shaped bracket is dimensioned to receive a portion of the elongated adapter element and permit vertical displacement of the bracket with respect to the adaptor element.

6. A measuring device as in claim 4; wherein, the measuring apparatus comprises a rotatable housing which contains a flexible, retractable, elongated measuring member.

7. A measuring device as in claim 6; wherein, the measuring member is further provided with a T-shaped lug on its distal end, and releasable locking means which will maintain the member in its extended position during use.

8. A measuring device as in claim 7; wherein, the measuring apparatus is operatively connected to a base member which is releasably secured to the L-shaped bracket member.

9. A measuring device as in claim 8; wherein, the base member is provided with a plurality or recesses which act as detents to prevent the rotation of the measuring member housing with respect to the L-shaped bracket member.

10. A measuring device as in claim 9; wherein, the measuring apparatus is attached to the L-shaped bracket by an elongated spring biased rod member, which is dimensioned to be received within an elongated aperture in the L-shaped bracket member.

11. A measuring device as in claim 10; wherein, the rod member extends through an aperture in the base member and is secured on one end to the measuring member housing.

12. A measuring device as in claim 11, wherein, the rod member is surrounded by a helical spring having one end which bears on an enlarged head on said rod member and the other end bears on the L-shaped bracket member.

13. A measuring device as in claim 1; wherein, the mounting bracket further comprises an apertured rectangular bracket member, which is dimensioned to receive a portion of said elongated adaptor element, and said rectangular bracket member is disposed between the L-shaped bracket member and said adaptor element.

* * * * *